United States Patent
Degtiarev et al.

(10) Patent No.: US 12,205,209 B1
(45) Date of Patent: Jan. 21, 2025

(54) VIRTUAL TRY-ON BASED ON PREDETERMINED CLOTH PATTERNS DRIVEN BY GENERATIVE AI

(71) Applicant: Glam Labs, Inc., San Francisco, CA (US)

(72) Inventors: Roman Degtiarev, Tbilisi (GE); Tikhon Vorobev, Saint Petersburg (RU); Vadim Titov, Moscow (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

(21) Appl. No.: 18/823,740

(22) Filed: Sep. 4, 2024

Related U.S. Application Data

(63) Continuation-in-part of application No. 18/748,397, filed on Jun. 20, 2024.

(51) Int. Cl.
| | | |
|---|---|---|
| *G06T 5/60* | (2024.01) | |
| *G06T 5/50* | (2006.01) | |
| *G06T 5/70* | (2024.01) | |
| *G06T 7/70* | (2017.01) | |
| *G06T 11/60* | (2006.01) | |

(52) U.S. Cl.
CPC ............ *G06T 11/60* (2013.01); *G06T 5/50* (2013.01); *G06T 5/60* (2024.01); *G06T 5/70* (2024.01); *G06T 7/70* (2017.01); *G06T 2207/20084* (2013.01); *G06T 2207/30201* (2013.01); *G06T 2210/16* (2013.01)

(58) Field of Classification Search
CPC ... G06T 11/60; G06T 5/50; G06T 5/60; G06T 5/70; G06T 7/70; G06T 2207/20084; G06T 2207/30201; G06T 2210/16
See application file for complete search history.

(56) References Cited

U.S. PATENT DOCUMENTS

| | | | |
|---|---|---|---|
| 11,922,550 B1 * | 3/2024 | Ramesh | ............... G06F 40/284 |
| 2024/0135611 A1 * | 4/2024 | Costin | .................... G06T 11/60 |

OTHER PUBLICATIONS

Zhang et al. "Adding Conditional Control to Text-to-Image Diffusion Models", Nov. 26, 2023. (Year: 2023).*
Zhu et al., "M&M VTO: Multi-Garment Virtual Try-On and Editing", Jun. 16, 2024. (Year: 2024).*

* cited by examiner

*Primary Examiner* — Phuoc Tran
(74) *Attorney, Agent, or Firm* — Georgiy L. Khayet

(57) ABSTRACT

Systems and methods for providing virtual try-on based on predetermined cloth patterns driven by generative AI are disclosed. An example method includes receiving an input image including an image of a body of a person and a first clothing worn by the person, receiving a text description of the first clothing and a further input image including a second clothing, encoding the input image into an image latent, generating a mask corresponding to the second clothing, encoding the text description into a text embedding, encoding the further input image into a clothing embedding, adding a noise to the image latent to obtain a noisy image latent, providing the noisy image latent, the text embedding, the clothing embedding, and the mask to a neural network to obtain a denoised image latent and decoding the denoised image latent into an output image including the body dressed in the second clothing.

18 Claims, 11 Drawing Sheets

VIRTUAL TRY-ON BASED ON PREDETERMINED CLOTH PATTERNS DRIVEN BY GENERATIVE AI

CROSS-REFERENCE TO RELATED APPLICATIONS

This application is a Continuation-in-Part of and claims the priority benefit of U.S. patent application Ser. No. 18/748,397, entitled "AI-DRIVEN PHOTO STYLIZATION WITH TEXT DESCRIPTION TUNING" and filed on Jun. 20, 2024. The subject matter of the aforementioned application is incorporated herein by reference in its entirety for all purposes.

TECHNICAL FIELD

This disclosure generally relates to image processing. More particularly, this disclosure relates to systems and methods for virtual try-on based on predetermined cloth patterns driven by generative artificial intelligence (AI).

BACKGROUND

Buying clothes online is becoming increasingly popular. However, one major drawback of buying online is that customers cannot try clothing on before making a purchase. This can deter customers from buying or increase the chances of the item being returned after the purchase. While there are some technical solutions that enable customers to try clothes on virtually, these solutions often lack realism in how the items are presented.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for providing virtual try-on based on predetermined cloth patterns driven by generative AI is disclosed. The method may include receiving an input image. The input image may include an image of the body of a person and a first clothing image. The first clothing image may include a first clothing worn by the person. The method may include receiving a text description of the first clothing and receiving a further input image. The further input image may include a second clothing. The method may include encoding the input image into an image latent associated with a latent space, generating, based on the further input image, a mask corresponding to the second clothing, encoding the text description into a text embedding aligning with the latent space, and encoding the further input image into a clothing embedding. The method may include randomly introducing Gaussian noise for the image latent and adding the noise to the image latent to obtain a noisy image latent. The method may include providing the noisy image latent, the text embedding, the clothing embedding, and the mask to a first neural network to obtain a further noise and removing the further noise from the noisy image latent to obtain a denoised image latent. The method may include decoding, using a second neural network, the denoised image latent into an output image. The output image may include a modified image of the body dressed in the second clothing.

The clothing embedding can be used to modify intermediate features generated by the first neural network during the obtaining of the additional noise. The first neural network may include a U-net neural network. The noise may include a Gaussian noise.

The method may include prior to providing the text embedding, extracting, from the input image, using a third neural network, information concerning a pose of the person in the input image and providing the information concerning the pose as a condition to the first neural network when obtaining the further noise. The output image depicts the person adopting the pose.

The method may include encoding the input image into an image embedding and providing the image embedding as a condition to the first neural network during the obtaining the further noise. The image embedding can be used to correct the denoised image latent to cause the modified image of the body to match the image of the body in the input image.

The method may include modifying the output image by removing at least one artifact from a face image present in the output image.

The method may include prior to decoding the denoised image latent, repeating until the denoised image latent converges to a further latent the following: providing the denoised image latent, the text embedding, the clothing embedding, and the mask to the first neural network to update the additional noise and removing the additional noise from the denoised image latent.

According to another embodiment, a system for virtual try-on based on predetermined cloth patterns driven by generative AI is provided. The system may include at least one processor and a memory storing processor-executable codes, where the processor can be configured to implement the operations of the above-mentioned method for providing virtual try-on based on predetermined cloth patterns driven by generative AI.

According to yet another aspect of the disclosure, there is provided a non-transitory processor-readable medium, which stores processor-readable instructions. When the processor-readable instructions are executed by a processor, they cause the processor to implement the above-mentioned method for providing virtual try-on based on predetermined cloth patterns driven by generative AI.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
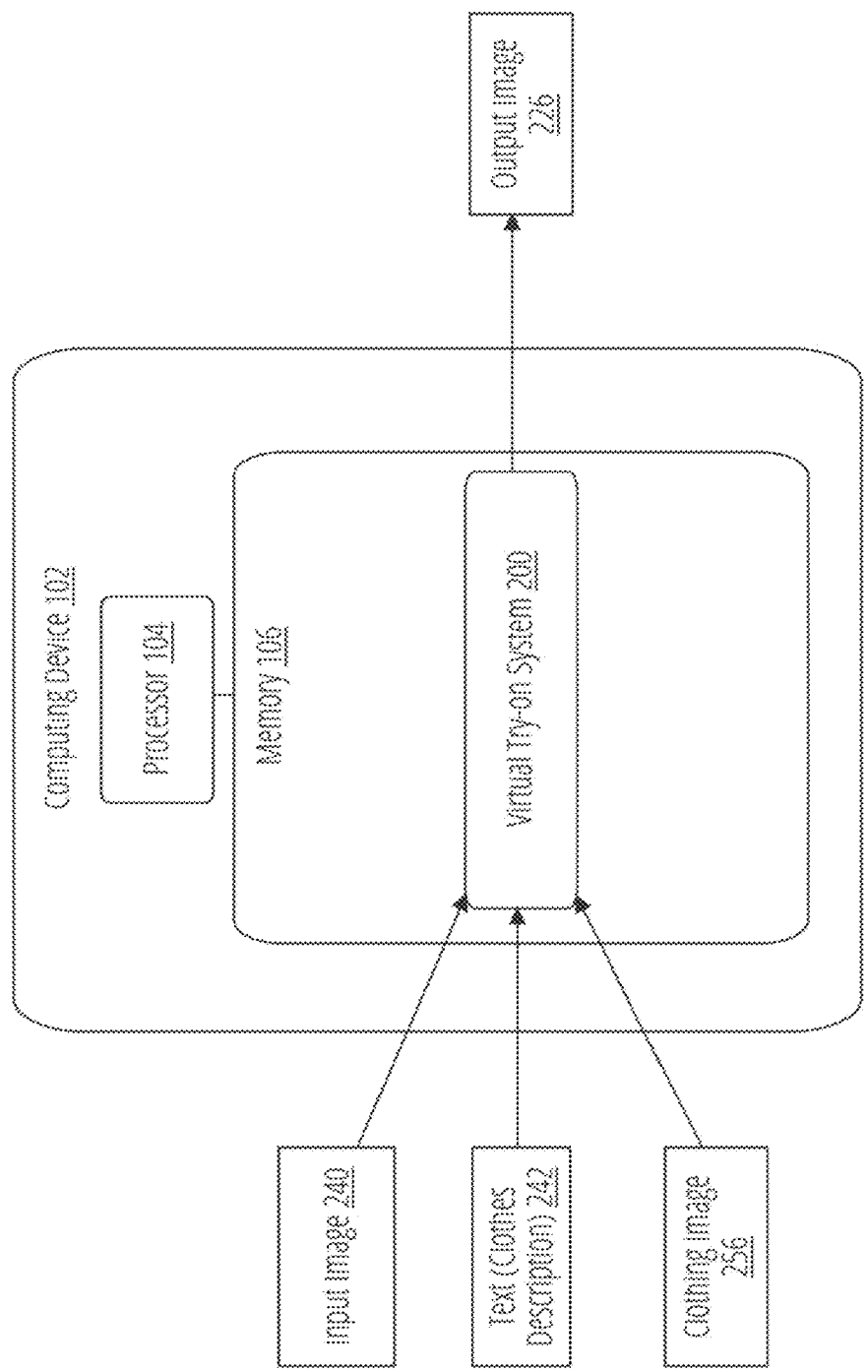
FIG. 1 shows an example environment, in which system and methods for adaptive image and video transformations can be implemented, according to some example embodiments of the present disclosure.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes system and methods for providing virtual try-on based on predetermined cloth patterns driven by generative AI. Embodiments of the present disclosure enable users to visualize different outfits on themselves in real-time, improving the online shopping experience. In some embodiments, user-provided images are analyzed to segment body and clothing areas. Diffusion models are then applied to seamlessly transfer clothes of various styles to the user-provided images while preserving high visual fidelity and a natural appearance.

Specifically, embodiments of the present disclosure may receive an input image of a person wearing the first clothing, an image of the second clothing to try-on and a text description of the first clothing. At a preprocessing stage, the input image is segmented into a body portion and a background portion and an area of the first clothing is detected. The area is to be redrawn using the second clothing. Input image is encoded by an image encoder into image embeddings. Text description is encoded by text encoder into a text embedding, which aligns with the latent space. Image of the second clothing is encoded by the image encoder into an image embedding with mask. Control net preprocessing can be used to obtain pose conditions corresponding to the pose that the person adopts in the input image. The input image is also encoded into an image latent. The image latent belongs to a latent space representation. The image latent is then contaminated by a noise to obtain a noisy image latent.

At generation stage, a U-net network is used to obtain a denoised image latent based on the noisy image latent, text embedding, which aligns with the latent space, image embedding, image embedding with mask 220 and pose conditions. An image decoder is then used to decode the denoised image latent into an output image. The output image may include the body of the person adopting the same pose as in the input image and wearing the second clothing. At a postprocessing stage, the output image can be refined by face restoration to remove blurriness and image noise and adding details to the face features of the person.

Unlike existing solutions, embodiments of the present disclosure allow to realistically depict the result of fitting on photographs of people using a photograph of clothing. Specifically, unlike the existing solutions, embodiments of the present disclosure enable to replace clothing of a persons in an image with a further clothing while preserving the rest of context of the image, such as the pose of the person and a background of the image.

Referring now to the drawings, FIG. 1 shows an example environment 100, in which system and methods for providing virtual try-on based on predetermined cloth patterns driven by generative AI can be implemented. Environment 100 may include a computing device 102 including a processor 104 and a memory 106. Memory 106 may store, as processor-executable instructions, a virtual try-on system 200.

Computing device 102 may include, but is not limited to, a notebook computer or desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

Virtual try-on system 200 can receive an input image 240, text 242, and clothing image 256. Input image 240 may include an image of the body of a person and a first clothing image. The first clothing image may include the first clothing worn by the person. The text 242 may include a description of the first clothing. Clothing image 256 may include a second clothing. The input image 240, text 242, and clothing image 256 can be received via a user interface as a user input. Input image 240 and clothing image 256 can be uploaded by the user to computing device 102 and stored in memory 106. Virtual try-on system 200 can generate an output image 226 based on input image 240, text 242, and clothing image 256. Output image 226 may include a modified image of the body dressed in the second clothing. Computing device 102 may display output image 226 to the user via a graphical display system. Details of virtual try-on system 200 are described in FIG. 2.

Figure 2:
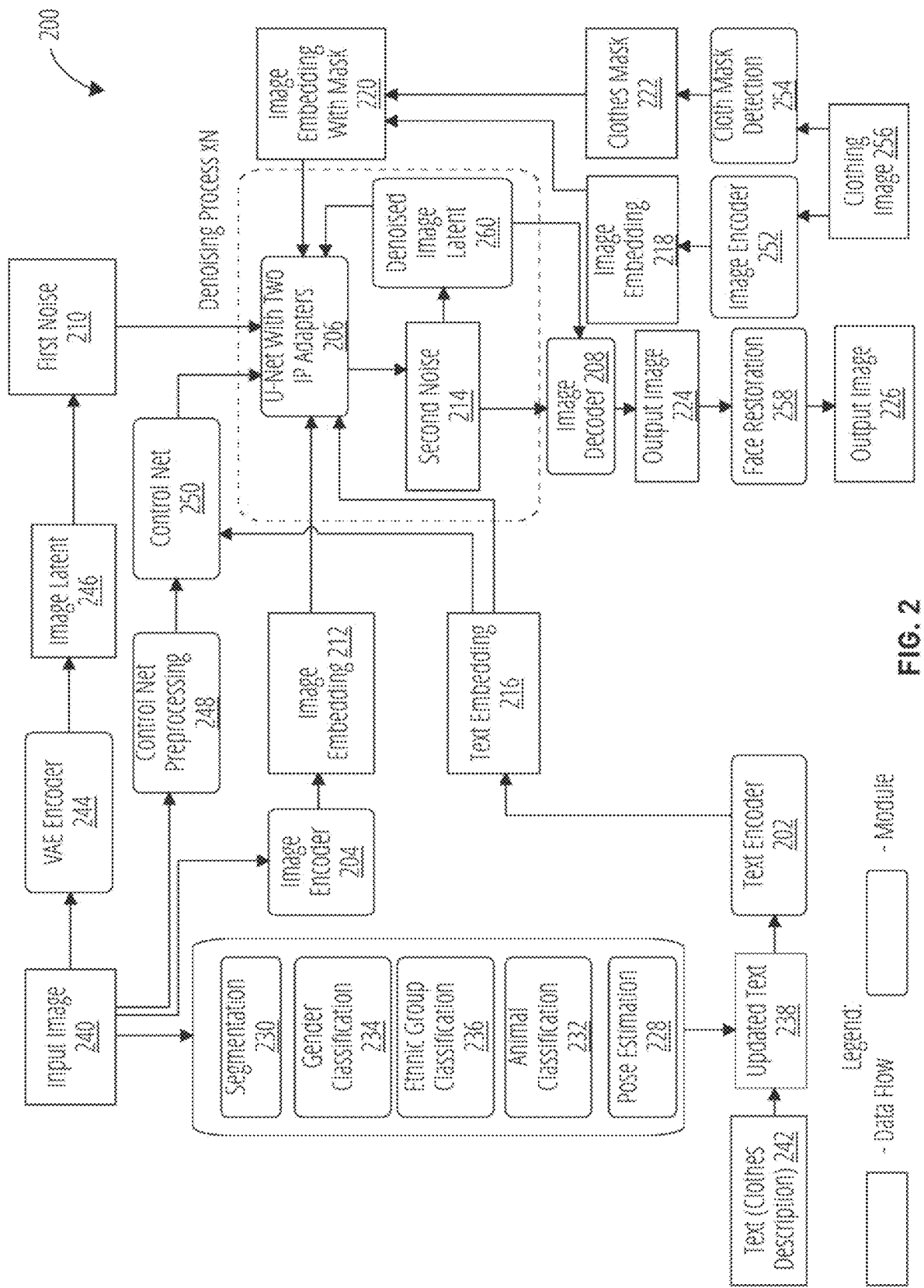
FIG. 2 is a block diagram illustrating an example virtual try-on system for providing virtual try-on based on predetermined cloth patterns driven by generative AI, according to some example embodiments.

FIG. 2 illustrates an example virtual try-on system 200 for providing virtual try-on based on predetermined cloth patterns driven by generative AI, according to some example embodiments.

The virtual try-on system 200 may include a VAE encoder 244, a text encoder 202, an image encoder 204, a U-net with two IP adapters 206, an image decoder 208, a pose estimation 228, a segmentation 230, an animal classification 232, a gender classification 234, an ethnic group classification 236, a control net preprocessing 248, a control net 250, an image encoder 252, a face restoration 258, a cloth mask detection 254. In other embodiments, virtual try-on system 200 may include fewer or more modules than shown in FIG. 2. In various embodiments, VAE encoder 244, text encoder 202, image encoder 204, U-net with two IP adapters 206, image decoder 208, pose estimation 228, segmentation 230, animal classification 232, gender classification 234, ethnic group classification 236, control net preprocessing 248, control net 250, image encoder 252, face restoration 258, cloth mask detection 254 can be implemented as pretrained neural networks.

VAE encoder 244 may receive input image 240 in one of computer readable formats and encode input image 240 into image latent 246 (also referred to as a latent vector). Image latent 246 may refer to a numerical representation of input image 240 in a vector space associated with a diffusion model.

Image encoder 204 may receive input image 240 in one of computer readable formats and encode input image 240 into an image embedding 212. Image embedding 212 may refer to a compressed, continuous, and typically lower-dimensional representation of input image 240 in a latent space representation. In some embodiments, image encoder 204 can be a convolutional neural network (CNN) or VIT (Vision Transformers), for example CLIP (Contrastive Language-Image Pre-training), or other types of networks designed to extract meaningful features from images.

Segmentation 230 may analyze input image 240 to determine portions of input image 240. The portions can be used by virtual try-on system 200 to generate masks for the portions. The masks may include a mask for the body of a person in input image 240, a mask of background in input image 240, a mask for the first clothing the person wears in input image 240, and so forth. The mask for the clothing can be further provided to U-net with two IP adapters 206 as a condition to identify an area where the second clothing present in clothing image 256 needs to be drawn.

Gender classification 234 may analyze input image 240 to determine a gender of a person present in input image 240. Ethnic group classification 236 may analyze input image 240 to determine an ethnic group of the person. Pose estimation 228 (such as DensePose) may predict a pose of the person in input image 240, for example, whether the person is facing away or facing the camera. Virtual try-on system 200 may further include one or more models for detecting further features of the person present in input image 240, such an age, a hairstyle, and so forth. Animal classification 232 may analyze input image 240 to determine a type and/or a breed of an animal present in input image 240. In various embodiments, segmentation 230, gender classification 234, ethnic group classification 236, animal classification 232, and pose estimation 228 can be implemented as pretrained neural networks.

Text (clothes description) 242 may include a text description of a clothing present in input image 240. For example, text (clothes description) 242 may include "a woman a woman dressed in a white skirt and a white blouse". The features determined by gender classification 234, ethnic group classification 236, animal classification 232, and pose estimation 228 can be added to text (clothes description) 242 to form an updated text 238. The example features added to the text (clothes description) 242, may include "an African young woman facing the camera", "a Caucasian man facing away from the camera", "a girl raising her right hand", and so forth. For example, if original text (clothes description) 242 includes "woman portrayed in an anime style" and ethnic group classification 236 determines that input image 240 includes an African woman, then the text (clothes description) 242 can be modified to include "an African woman in anime style". Updated text 238 can be provided to text encoder 202.

Text encoder 202 may encode the updated text 238 into a text embedding 216. Text embedding 216 may refer to a numerical representation of a text in a latent space representation. The latent space representation of text embedding 216, may align with the latent space representation of image embedding 212 generated by the image encoder 204. The text encoder 202 can be CLIP, or other networks designed to transform the text into text embedding, which aligns with the latent spaces.

Control net preprocessing 248 may analyze input image 240 to determine an additional input for control net 250. The additional input may include sketches, outlines, edge maps, key points, and other features in the input image 240. In some embodiments, control net preprocessing 248 may generate a skeleton of a person present in input image 240. Control net 250 can generate, based on text embedding and the additional input, a control vector in an internal format readable by U-net with two IP adapters 206. The control vector can be used to modify internal features generated by layers of U-net with two IP adapters 206.

Virtual try-on system can generate a first noise 210 of the same size as the image latent 246. This first noise 210 typically consists of randomly generated Gaussian noise for a specific portion of image latent 246 that corresponds to a section of input image 240. The first noise 210 can be injected into the image latent 246 to obtain noisy image latent. The noisy image latent is processed by U-net with two IP adapters 206.

Image encoder 252 may receive clothing image 256 in one of computer readable formats and encode clothing image 256 into an image embedding 218. Image embedding 218 may refer to a compressed, continuous, and typically lower-dimensional representation of clothing image 256 in a latent space representation. In some embodiments, image encoder 252 can be a convolutional neural network (CNN) or VIT (Vision Transformer), for example CLIP, or other types of networks designed to extract meaningful features from images.

Cloth mask detection 254 may receive clothing image 256 in one of computer readable and determine a clothes mask 222 of the second clothing present in clothing image 256. Virtual try-on system 200 may generate image embedding with mask 220 based on the clothes mask 222 and image embedding 218. Image embedding with mask 220 corresponds to a portion of clothes mask 222. The portion may include solely area covered by the second clothing present in the clothing image 256.

U-net with two IP adapters 206 may include a U-net and a first Input Processing Adapter (IP Adapter) and a second IP Adapter. U-net may include cross-attention layers to integrate the text embedding, image embedding 212, image embedding with mask 220 and control vector generated by control net 250.

U-net is trained to predict second noise 214. This second noise 214 represents the difference between the noisy image latent and the denoised approximation that aligns with the true data distribution of image latents. This true data distribution approximates the probability distribution of clean image latents derived from a set of sample images.

The first IP Adapter and the second IP Adapter can be an additional module or component that modifies how the input data is processed before being fed to the U-net. Combining a U-Net with the first IP Adapter and the second IP Adapter allows incorporating additional inputs and control mechanisms to enhance the image processing capabilities of the U-Net. The first IP-Adapter can process the image embedding 212 to extract useful information or modify the image embedding 212 to ensure that the U-Net generates correct output. The second IP-Adapter can process the image embedding with mask 220 to extract useful information or modify the image embedding with mask 220 to ensure that the U-Net generates correct output. In certain embodiments, the information extracted from the image embedding 212 and image embedding with mask 220 can be used to modify internal features generated by the U-net during prediction of the second noise.

Virtual try-on system 200 can generate masks determining how different parts of input image 240 are processed. Specifically, virtual try-on system 200 may create a mask that defines to what extent to process and change different parts of input image 240 (for example, faces, facial features, foreground, background, and clothes area). Accordingly in some embodiments, virtual try-on system 200 can generate different first noise 210 (and correspondently, second noise 214) for various portions of input image 240, allowing specific regions to be modified differently. This targeted approach ensures that some areas of input image 240 are altered less or more than others, enabling the application of different styles to specific sections based, for example, on the prompts provided in text (clothes description) 242. The first noise 210 can be injected only into the part of image latent 246 that corresponds to a region of input image 240 defined by the mask. For example, first noise 210 can be injected only in the part of image latent 246 that corresponds to a first clothing present in input image 240.

Virtual try-on system 200 may utilize second noise 214 to obtain a denoised image latent by applying a linear transformation to the noisy image latent. The denoised image latent 260 can then be processed by U-net with two IP adapters 206 to update second noise 214, which in turn can be used to update the denoised image latent 260. This iterative process of predicting second noise 214 and updating denoised image latent 260 can be repeated several times (e.g., five) until the denoised image latent 260 converges to an image latent belonging to the true data distribution of embedding corresponding to images. Thus, the iterative process progressively aligns the denoised image latent 260 with the desired data distribution and achieve high-quality stylization.

After the iterative denoising steps, the denoised image latent 260 is provided to image decoder 208. The image decoder 208, which may include a VAE decoder, processes the refined denoised image latent 260 to generate an output image 224. Output image 224 may include the person present in input image 240 that wears the second clothing instead of the first clothing.

Face restoration 258 may modify the output image 224 to remove one or more artifact from the face image of the person in output image to generate output image 226. In some embodiments, face restoration 258 can remove blurriness and image noise in the face image and add details to the face features of the face image, such as eyes, noise, lips, ears, and the like.

Figure 3:
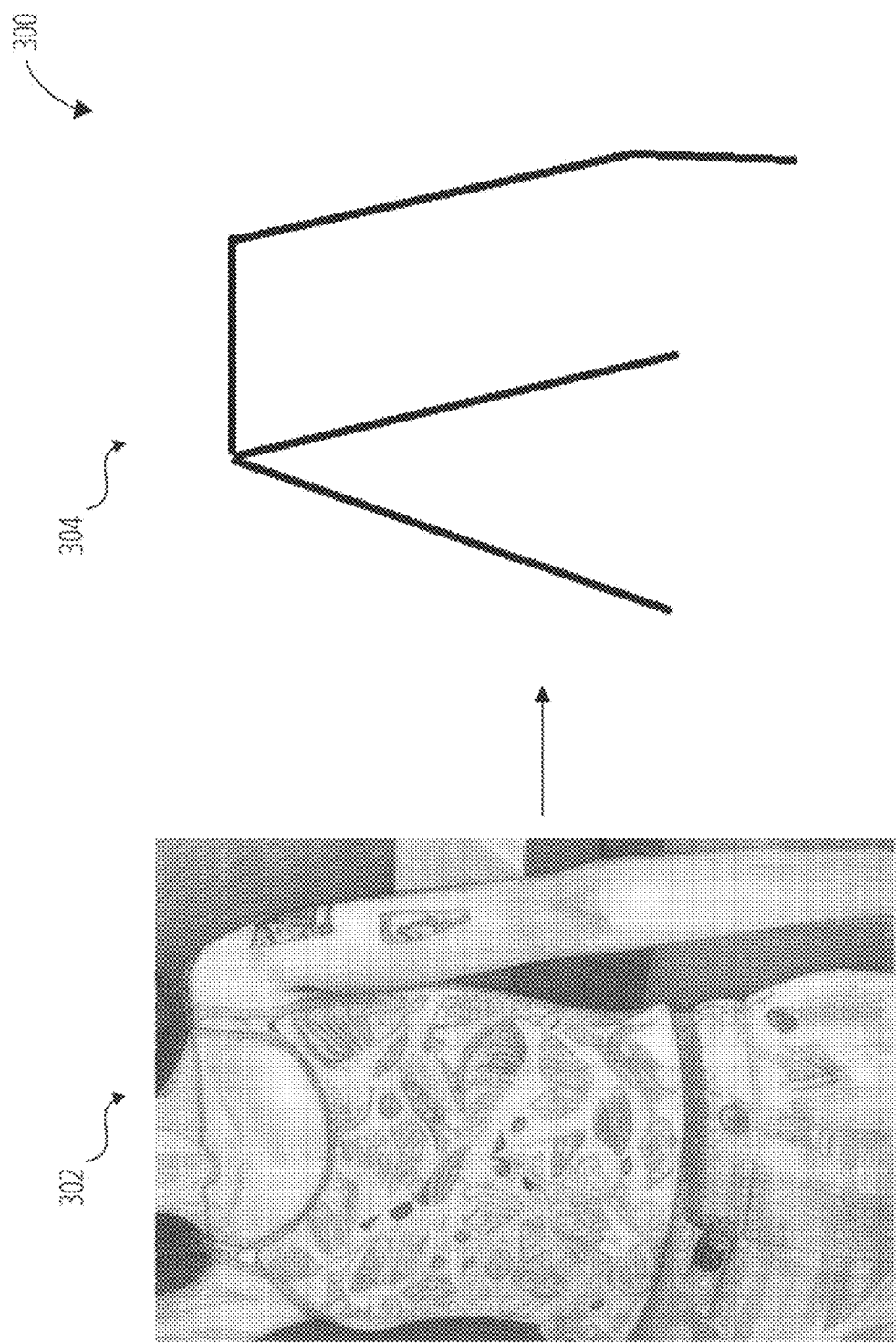
FIG. 3 is a schematic showing an example image and a skeleton of a person present in the image, according to an example embodiment of the present disclosure.

FIG. 3 is a schematic 300 showing an example image 302 and corresponding skeleton 304. Pose estimation 228 (shown in FIG. 2) may include a neural network that generates skeleton 304 from image 302. Points in skeleton 304 can be assigned colors indicating a coordinate of the points in a horizontal direction from the point of view of the camera. In some embodiments, the skeleton 304 can be generated by a DensePose.

Pose estimation 228 may include a model that determines the pose of the person in image 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if original text (clothes description) 242 includes "woman in anime style", then the text (clothes description) 242 can be modified to "woman in anime style in front".

Figure 4:
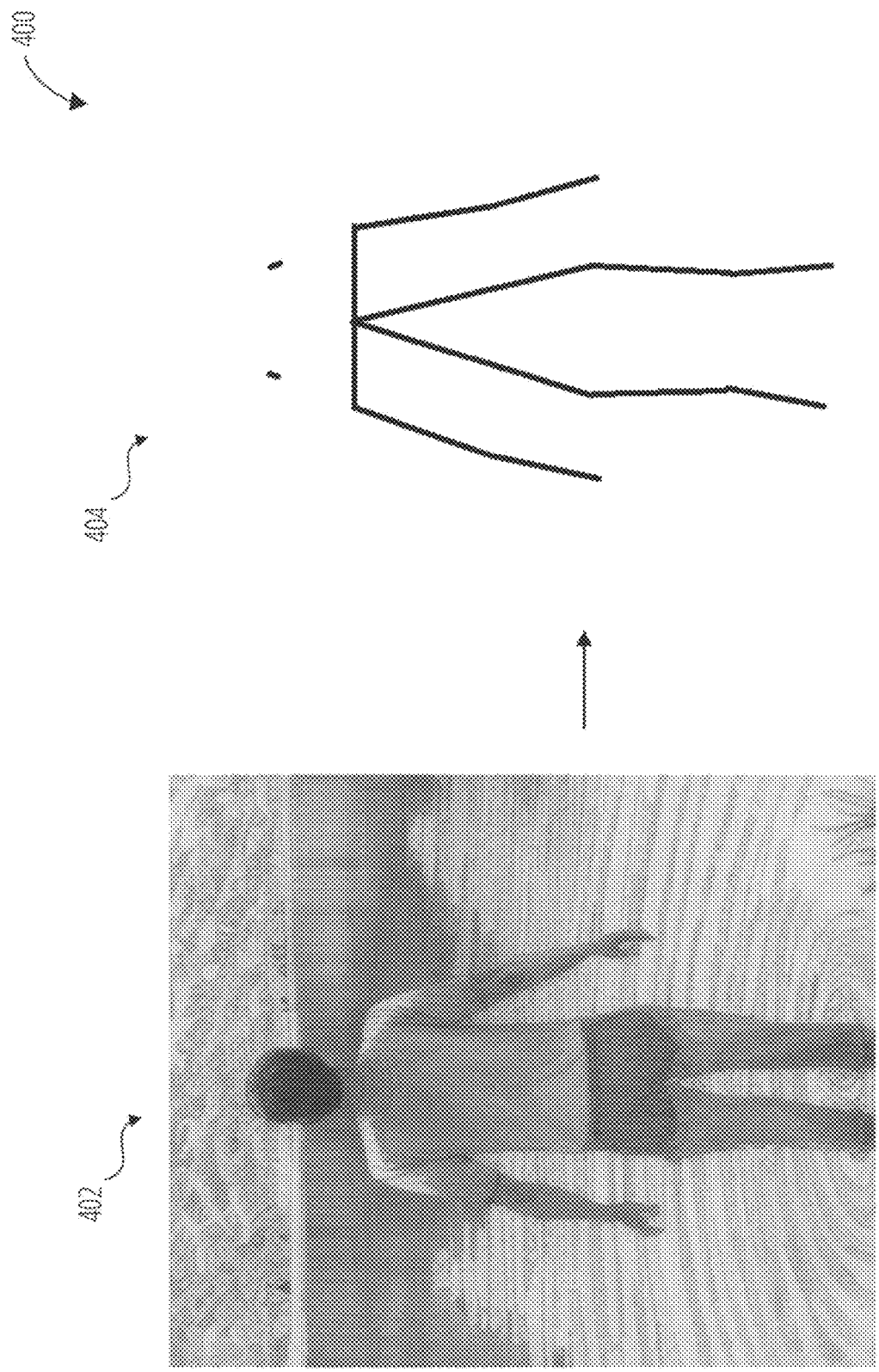
FIG. 4 is a schematic showing another example image and a skeleton of a person present in the image, according to an example embodiment of the present disclosure.

FIG. 4 is a schematic 400 showing an example image 402 and corresponding skeleton 404. In image 402, a person is shown in full length. In corresponding skeleton 304, the left shoulder and the right shoulder have the same coordinate in the horizontal direction from the point of view of the camera. However, the coordinate of the right hip is smaller than the coordinate of the left hip. It means that the person is facing backwards. Accordingly, if original text (clothes description) 242 includes "a man in anime style", then the text (clothes description) 242 can be modified to "body of a man in anime style viewed from behind".

Figure 5:
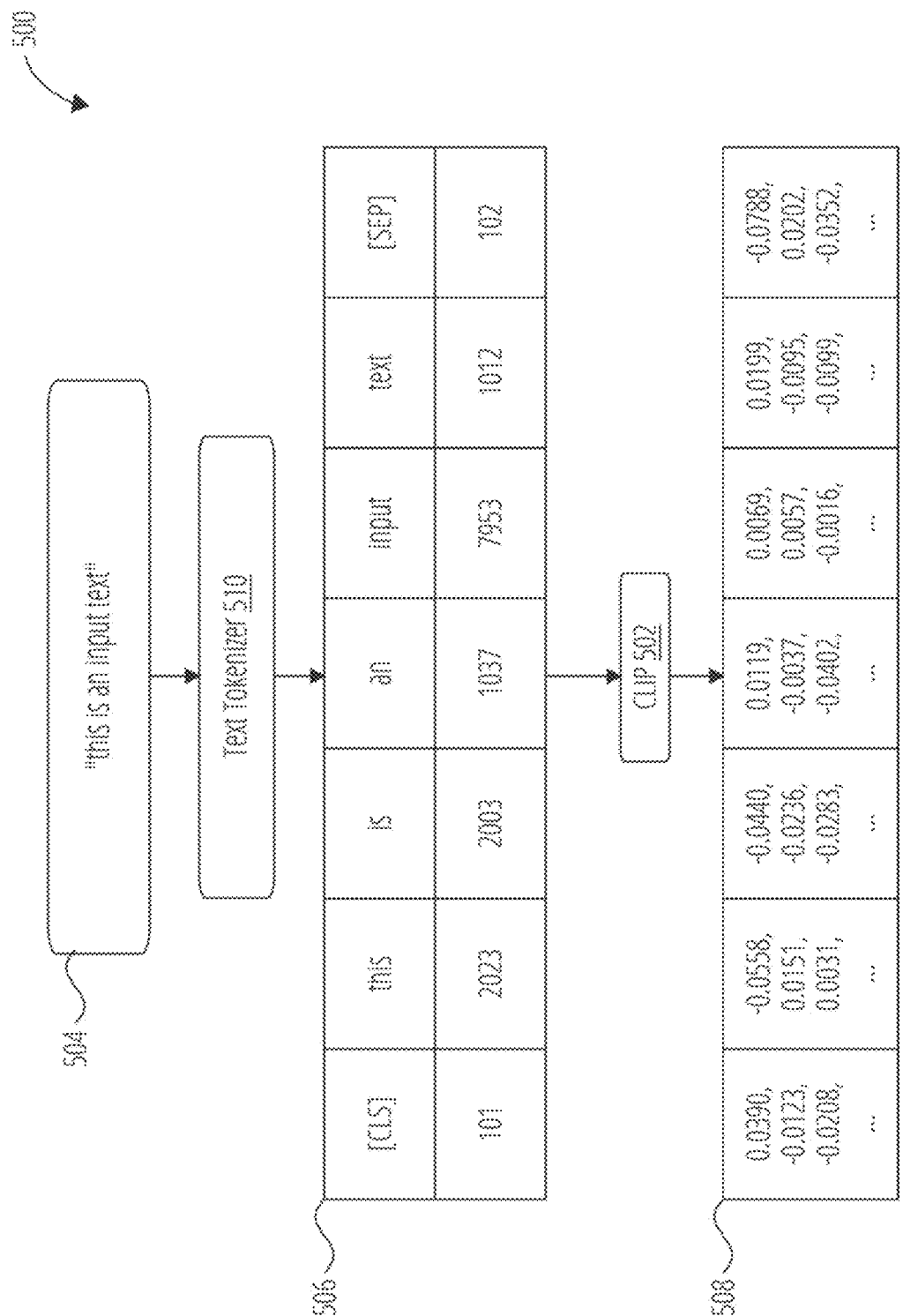
FIG. 5 is a block diagram showing details of a text encoder, according to an example embodiment of the present disclosure.

FIG. 5 is a block diagram 500 showing details of converting text into text embedding, which aligns with a latent space (shown in FIG. 2), according to an example embodiment. In the example of FIG. 5, CLIP 502 is used as text encoder 202 shown in FIG. 2. Text tokenizer 510 may generate text tokens 506 from raw text 504, for example, text (clothes description) 242. Then text tokens 506 can be provided to CLIP 502 to generate text embedding 508, which aligns with the latent spaces.

Figure 6:
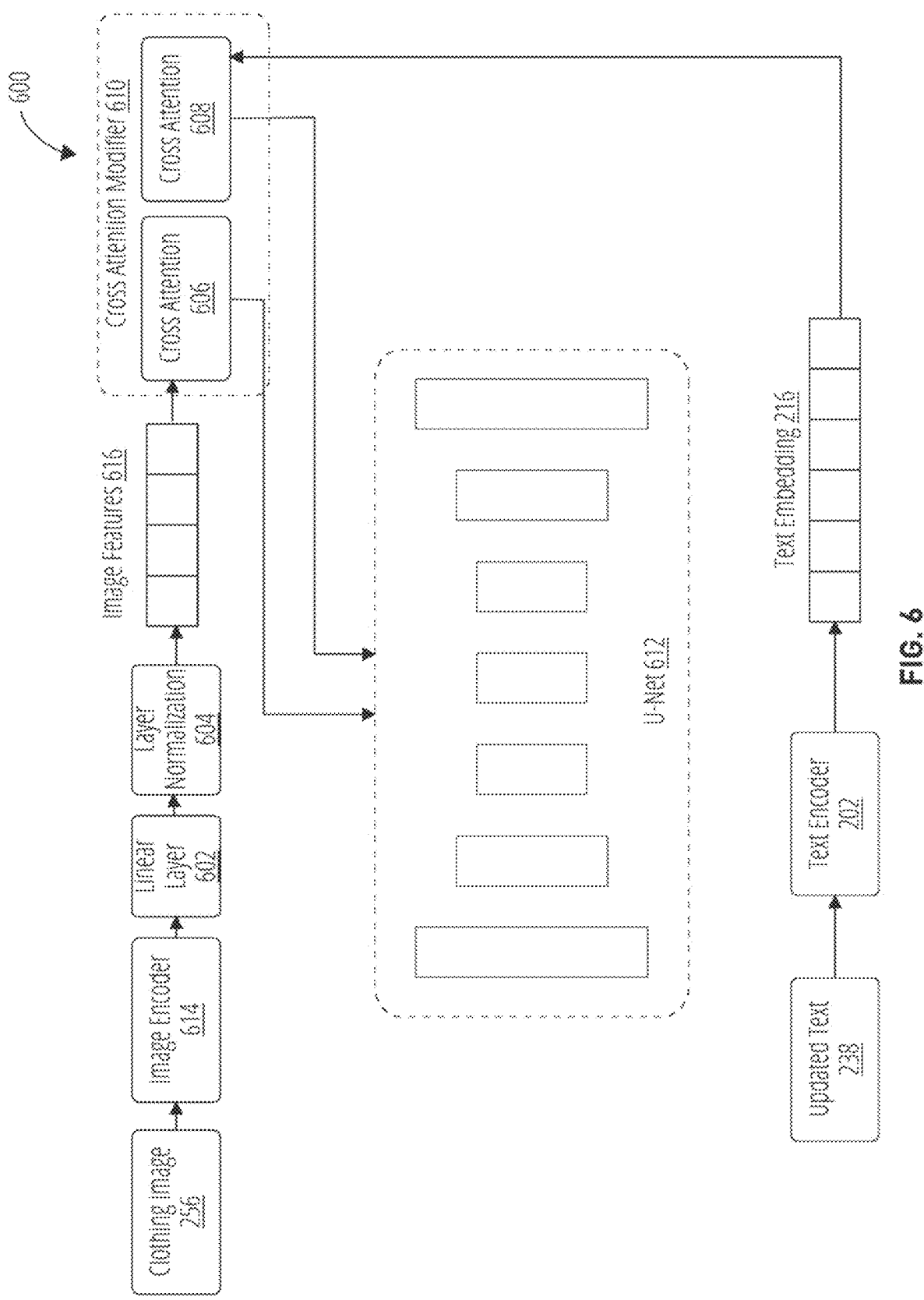
FIG. 6 is a block diagram showing some modules of a virtual try-on system, according to some example embodiments.

FIG. 6 is a block diagram 600 showing some modules of virtual try-on system 200, according to some example embodiments. FIG. 6 provides details of the second IP Adapter of U-net with two IP adapters 206 described in FIG. 2. As shown in FIG. 6, virtual try-on system 200 may include, among other modules, an image encoder 614, a linear layer 602, a layer normalization 604, a cross attention modifier 610, a text encoder 202, and U-net 612.

The second IP-Adapter integrates a clothing image 256 into the U-Net generation process to ensure that the generated clothing aligns with the input image 240 (shown in FIGS. 1 and 2). The second IP-Adapter may include image encoder 614, linear layer 602, layer normalization 604, and cross attention modifier 610.

The image encoder 204, linear layer 602, and layer normalization 604 extract and compress the visual information from the clothing image 256. This allows the U-net 612 to efficiently utilize the visual details of the clothing during the generation process.

Cross attention modifier 610 may include cross attention 606. Cross attention 606 is designed to enable the U-net 612 to focus on image features 616. In this context, the cross-attention layers within the U-net 612 are enhanced with additional attention heads. These heads modify the intermediate features generated by the U-net 612, ensuring that the generated clothing is more accurately aligned with the visual characteristics of the clothing image 256. Cross attention 608 is designed to enable U-net 612 to focus on text features text embedding 216generated by text encoder 202 from updated text 238 (described in FIG. 2). The intermediate features generated by U-net 612 are modified to ensure that the generated clothing is more accurately aligned with the visual characteristics found in the updated text 238.

Figure 7:
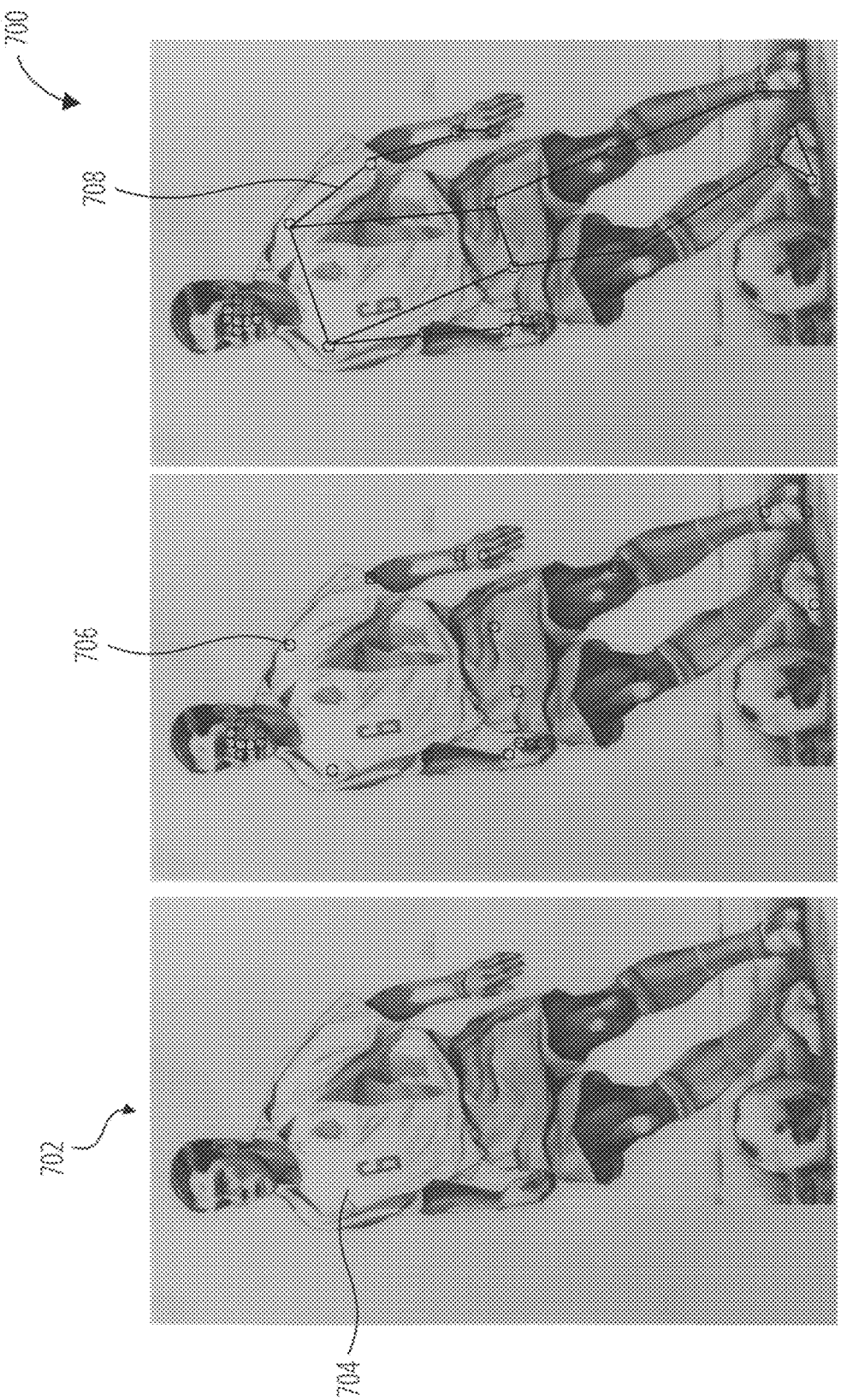
FIG. 7 is a schematic showing an example input image and a skeleton of a person present in the image, according to an example embodiment of the present disclosure.

FIG. 7 is a schematic 700 showing an example input image 702 and corresponding skeleton 708. Control net preprocessing 248 (shown in FIG. 2) may determine a pose of person 704 input image 702. Specifically, control net preprocessing 248 may determine locations of key points 706, such facial key points and joints. Control net preprocessing 248 can generate a skeleton 708. Skeleton 708 includes key points 706 (coordinates) and connections between key points 706 in the form of a graph. Skeleton 708 can be used as a condition for a U-net with two IP adapters 206 during generating second noise 214 and denoised image latent 260 (described in FIG. 2). Skeleton 708 can be provided to control net 250 (shown in FIG. 2). Control net 250 can incorporate information about person's pose (skeleton 708) and modifies U-Net generation according to the pose to ensure that final result (output image 224 shown in FIG. 2) is aligned with initial person's pose.

Figure 8:
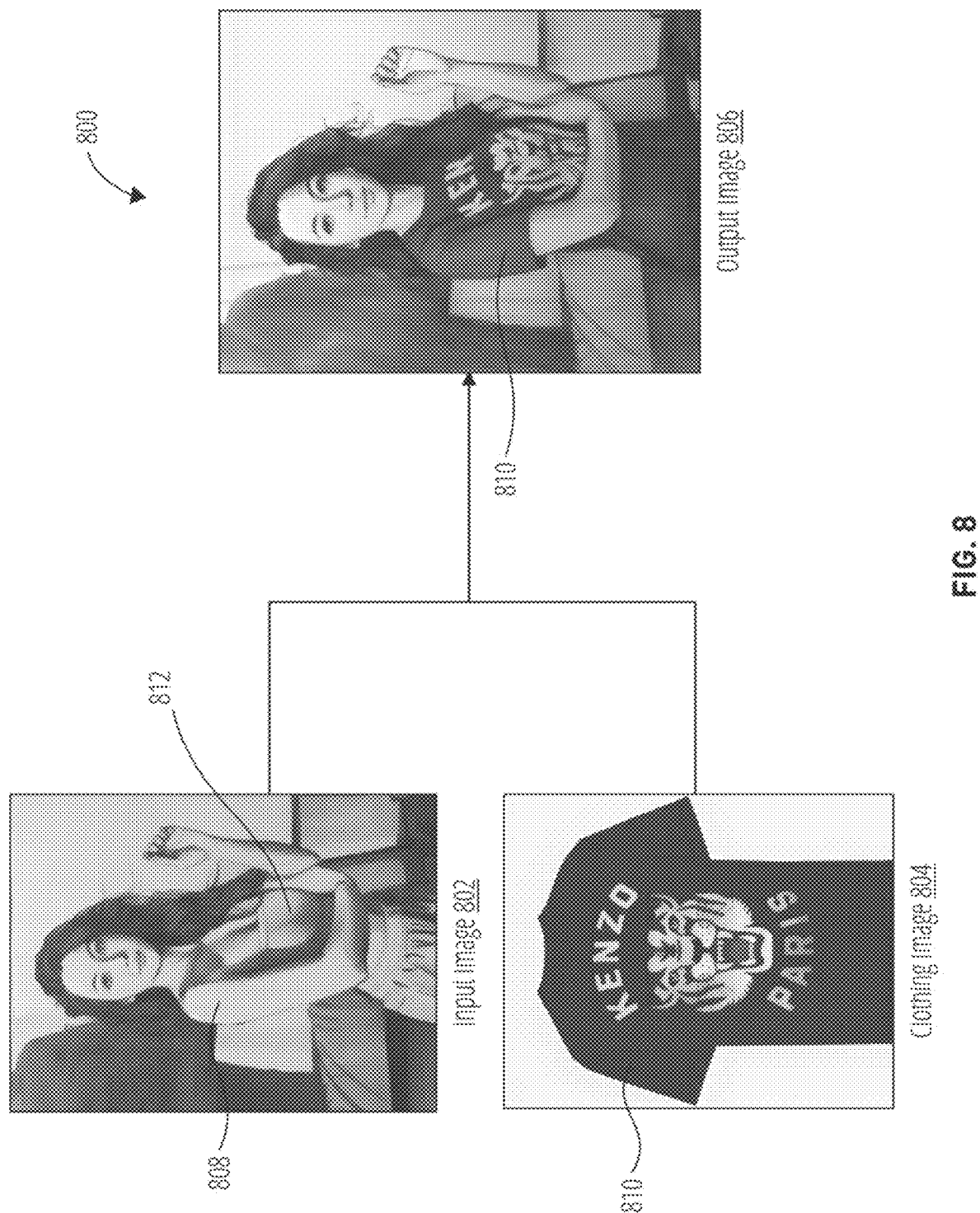
FIG. 8 is a schematic showing an example input image, an example clothing image, and an output image, according to an example embodiment of the present disclosure.

FIG. 8 is a schematic 800 showing an example input image 802, an example clothing image 804, and an output image 806. As shown in FIG. 8, input image 802 includes the body of person 808 adopting a pose. Person 808 is wearing first clothing 812. Clothing image 904 includes second clothing 810. Output image 806 includes the body of person 808 wearing second clothing 810. Person 808 in output image 806 adopts the same pose as in input image 802.

Figure 9:
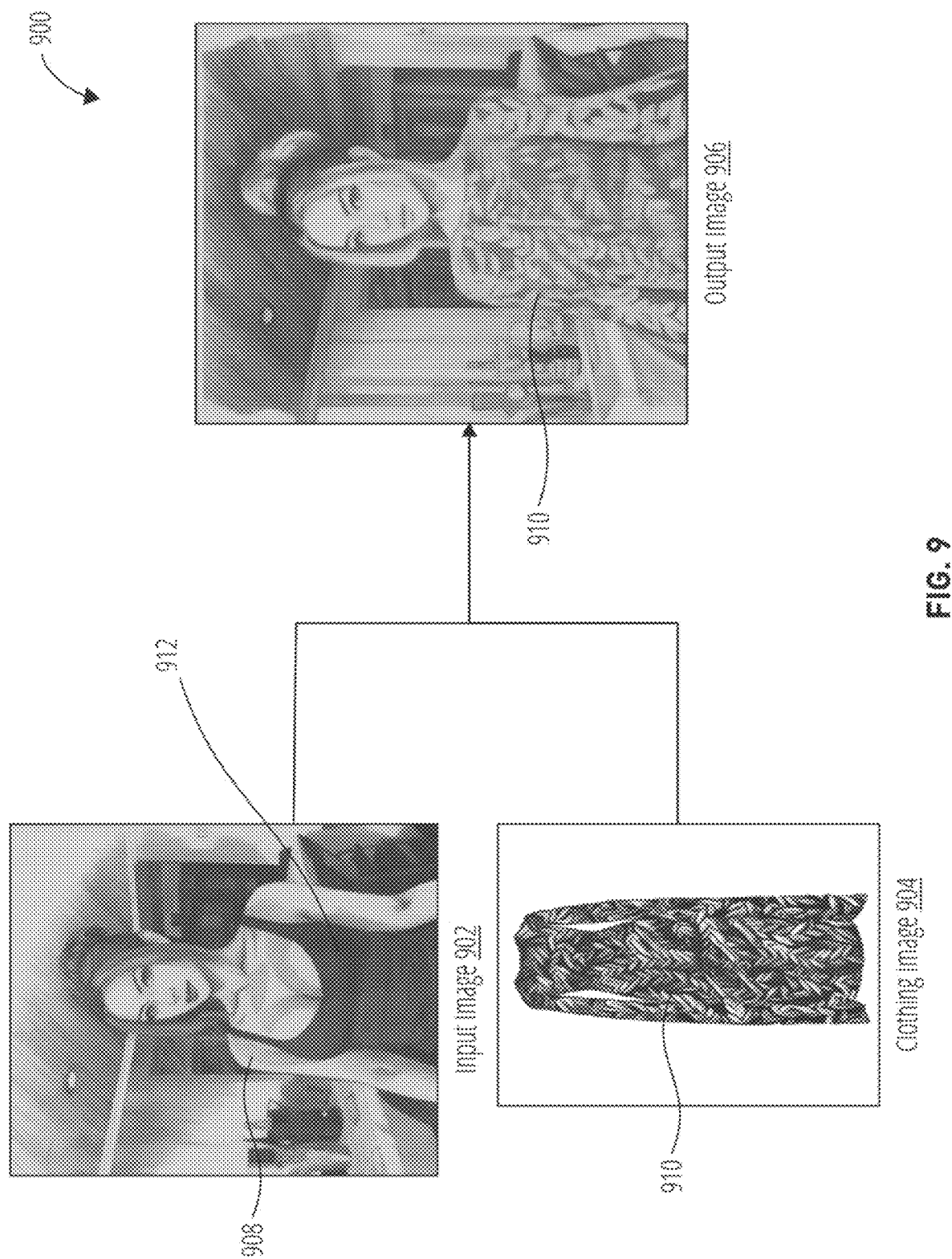
FIG. 9 is a schematic showing an example input image, an example clothing image, and an output image, according to another example embodiment of the present disclosure.

FIG. 9 is a schematic 900 showing an example input image 902, an example clothing image 904, and an output image 906. As shown in FIG. 9, input image 902 includes the body of person 908 adopting a pose. Person 908 is wearing first clothing 912. Clothing image 904 includes second clothing 910. Output image 906 includes the body of person 908 wearing second clothing 9. Person 908 in output image 906 adopts the same pose as in input image 902.

Figure 10:
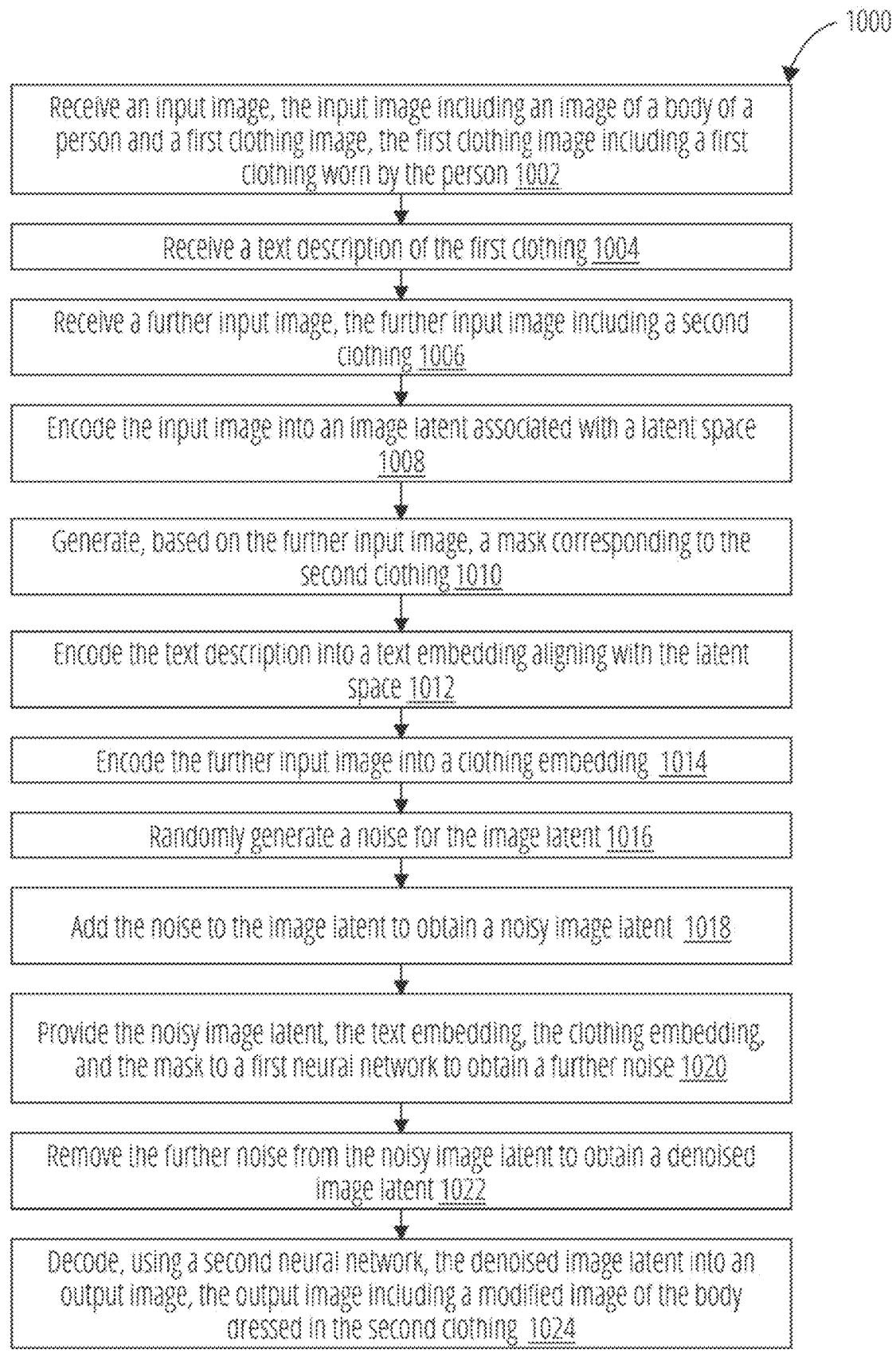
FIG. 10 is a flow chart showing a method for providing virtual try-on based on predetermined cloth patterns driven by generative AI, according to some example embodiments.

FIG. 10 is a flow chart showing method 1000 for providing virtual try-on based on predetermined cloth patterns driven by generative AI, according to some example embodiments. In some embodiments, the operations of method 1000 may be combined, performed in parallel, or performed in a different order. Method 1000 may also include additional or fewer operations than those illustrated. Method 1000 may be performed by processing logic that comprises hardware (e.g., decision making logic, dedicated logic, programmable logic, and microcode), software (such as software run on a general-purpose computer system or a dedicated machine), or a combination of both.

In block 1002, method 1000 may include receiving an input image. The input image may include an image of the body of a person and a first clothing image. The first clothing image may include the first clothing worn by the person. In block 1004, method 1000 may include receiving a text description of the first clothing. In block 1006, method 1000 may receiving a further input image. The further input image may include the second clothing.

In block 1008, method 1000 may include encoding the input image into an image latent associated with a latent space. In block 1010, method 1000 may include generating, based on the further input image, a mask corresponding to the second clothing.

In block 1012, method 1000 may include encoding the text description into a text embedding. The text embedding may align with the latent space. In block 1014, method 1000 may include encoding the further input image into a clothing embedding.

In block 1016, method 1000 may include randomly generating a noise for the image latent. In block 1018, method 1000 may include adding the noise to the image latent to obtain a noisy image latent. The noise may include a Gaussian noise.

In block 1020, method 1000 may include providing the noisy image latent, the text embedding, the clothing embedding, and the mask to a first neural network to obtain a further noise. In block 1022, method 1000 may include removing the further noise from the noisy image latent to obtain a denoised image latent. The clothing embedding can be used to modify intermediate features generated by the first neural network during the obtaining the additional noise. The first neural network may include a U-net neural network.

In block 1024, method 1000 may include decoding, using a second neural network, the denoised image latent into an output image. The output image may include a modified image of the body dressed in the second clothing.

Method 1000 may include prior to decoding the denoised image latent, repeating until the denoised image latent converges to a further latent the following operations: providing the denoised image latent, the text embedding, the clothing embedding, and the mask to the first neural network to update the further noise and removing the further noise from the denoised image latent.

Method 1000 may include prior to providing the text embedding to the first neural network, extracting, from the input image, using a third neural network, information concerning a pose of the person in the input image and providing the information concerning the pose as a condition to the first neural network when obtaining the further noise. The output image may depict the person adopting the pose.

Method 1000 may include encoding the input image into an image embedding and providing the image embedding as a condition to the first neural network during the obtaining the further noise. The image embedding can be used to correct the denoised image latent to cause the modified image of the body to match the image of the body in the input image.

Method 1000 may include modifying the output image by removing at least one artifact from a face image present in the output image.

Figure 11:
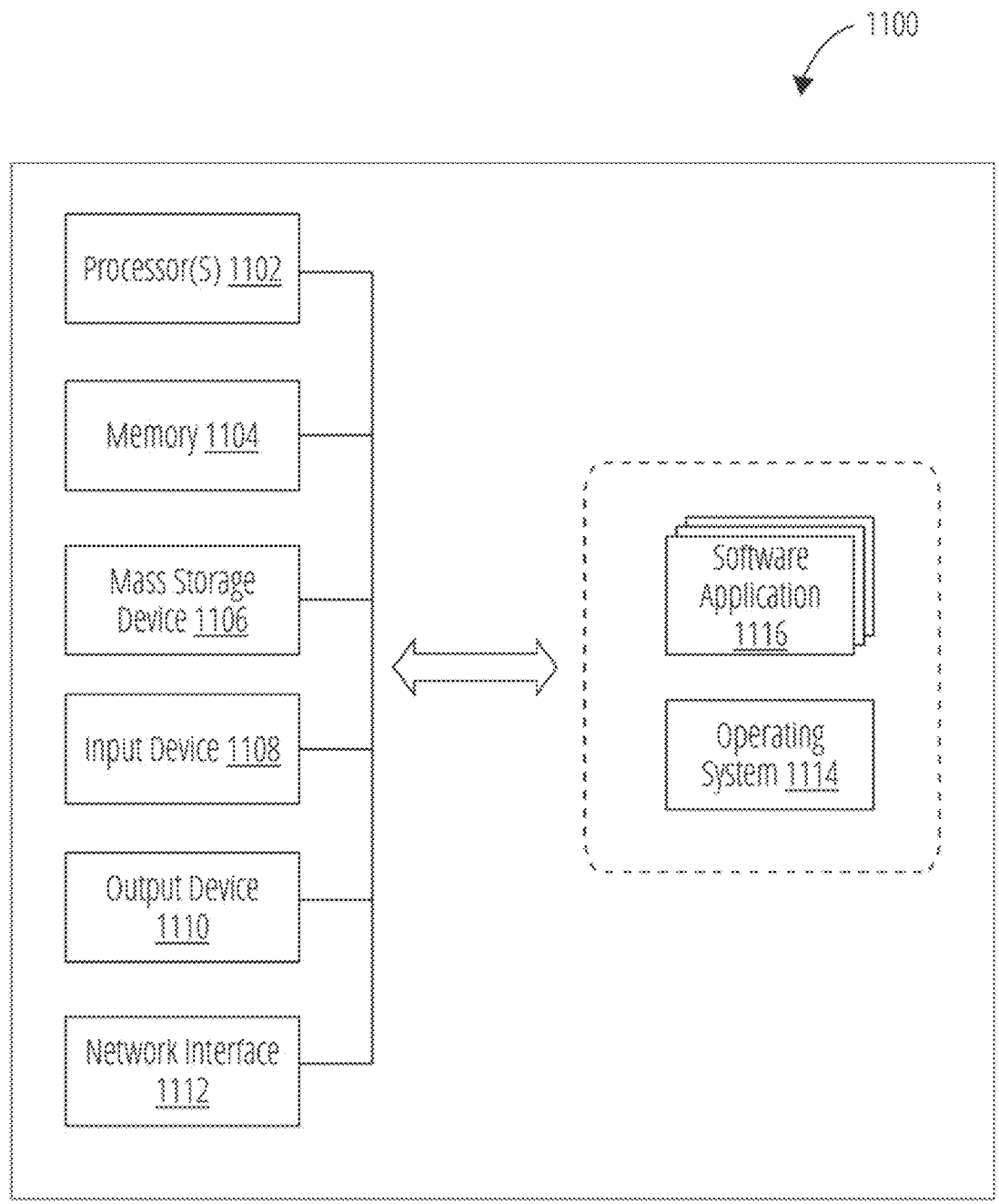
FIG. 11 is a high-level block diagram illustrating an example computer system, within which a set of instructions for causing the machine to perform any one or more of the methodologies discussed herein can be executed.

FIG. 11 is a high-level block diagram illustrating an example computer system 1100, within which a set of instructions for causing the machine to perform any one or more of the methodologies discussed herein can be executed. The computer system 1100 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 1100 is an example of computing device 102 shown in FIG. 1. Notably, FIG. 11 illustrates just one example of the computer system 1100 and, in some embodiments, the computer system 1100 may have fewer elements/modules than shown in FIG. 11 or more elements/modules than shown in FIG. 11.

The computer system 1100 may include one or more processor(s) 1102, a memory 1104, one or more mass storage devices 1106, one or more input devices 1108, one or more output devices 1110, and a network interface 1112. The processor(s) 1102 are, in some examples, configured to implement functionality and/or process instructions for execution within the computer system 1100. For example, the processor(s) 1102 may process instructions stored in the memory 1104 and/or instructions stored on the mass storage devices 1106. Such instructions may include components of an operating system 1114 or software applications 1116. The computer system 1100 may also include one or more additional components not shown in FIG. 11, such as a body, a power supply, a power supply, a global positioning system (GPS) receiver, and so forth.

The memory 1104, according to one example, is configured to store information within the computer system 1100 during operation. The memory 1104, in some example embodiments, may refer to a non-transitory computer-readable storage medium or a computer-readable storage device. In some examples, the memory 1104 is a temporary memory, meaning that a primary purpose of the memory 1104 may not be long-term storage. The memory 1104 may also refer to a volatile memory, meaning that the memory 1104 does not maintain stored contents when the memory 1104 is not receiving power. Examples of volatile memories include random access memories (RAM), dynamic random access memories (DRAM), static random access memories (SRAM), and other forms of volatile memories known in the art. In some examples, the memory 1104 is used to store program instructions for execution by the processor(s) 1102. The memory 1104, in one example, is used by software (e.g., the operating system 1114 or the software applications 1116). Generally, the software applications 1116 refer to software Applications suitable for implementing at least some operations of the methods for providing virtual try-on based on predetermined cloth patterns driven by generative AI as described herein.

The mass storage devices 1106 may include one or more transitory or non-transitory computer-readable storage media and/or computer-readable storage devices. In some embodiments, the mass storage devices 1106 may be configured to store greater amounts of information than the memory 1104. The mass storage devices 1106 may further be configured for long-term storage of information. In some examples, the mass storage devices 1106 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 1108, in some examples, may be configured to receive input from a user through tactile, audio, video, or biometric channels. Examples of the input devices 1108 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1100, or components thereof.

The output devices 1110, in some examples, may be configured to provide output to a user through visual or auditory channels. The output devices 1110 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 1110 may also include a touchscreen, a presence-sensitive display, or other input/output capable displays known in the art.

The network interface 1112 of the computer system 1100, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 1112 may be a network interface card, such as an Ethernet card, an optical transceiver, a radio frequency transceiver, or any other type of device that can send and receive information.

The operating system 1114 may control one or more functionalities of the computer system 1100 and/or components thereof. For example, the operating system 1114 may interact with the software applications 1116 and may facilitate one or more interactions between the software applications 1116 and components of the computer system 1100. As shown in FIG. 11, the operating system 1114 may interact with or be otherwise coupled to the software applications 1116 and components thereof. In some embodiments, the software applications 1116 may be included in the operating system 1114. In these and other examples, virtual modules, firmware, or software may be part of software applications 1116.

Thus, systems and methods for providing virtual try-on based on predetermined cloth patterns driven by generative AI have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
    receiving an input image, the input image including an image of a body of a person and a first clothing image, the first clothing image including a first clothing worn by the person;
    receiving a text including a description of the first clothing;
    receiving a further input image, the further input image including a second clothing;
    encoding the input image into an image latent associated with a latent space;
    generating, based on the further input image, a mask corresponding to the second clothing;
    extracting, from the input image, using a pretrained neural network, at least one feature of the person present in the input image, the at least one feature including one or more of the following: an ethnicity of the person, a gender of the person, an age of the person, and an orientation of the body of the person with respect to a plane of the input image;
adding the at least one feature to the text to obtain an updated text;
extracting, from the input image, using a further pretrained neural network, information concerning a pose of the person in the input image;
encoding the updated text into a text embedding aligning with the latent space;
encoding the further input image into a clothing embedding;
randomly generating a noise for the image latent;
adding the noise to the image latent to obtain a noisy image latent;
providing the noisy image latent, the text embedding, the clothing embedding, and the mask to a first neural network to obtain a further noise;
while obtaining the further noise, providing the information concerning the pose as a condition to the first neural network;
removing the further noise from the noisy image latent to obtain a denoised image latent; and
decoding, using a second neural network, the denoised image latent into an output image, the output image including a modified image of the body dressed in the second clothing.

2. The method of claim 1, wherein the output image depicts the person adopting the pose.

3. The method of claim 1, further comprising:
encoding the input image into an image embedding; and
providing the image embedding as a condition to the first neural network during the obtaining the further noise.

4. The method of claim 3, wherein the image embedding is used to correct the denoised image latent to cause the modified image of the body to match the image of the body in the input image.

5. The method of claim 1, further comprising modifying the output image by removing at least one artifact from a face image present in the output image.

6. The method of claim 1, wherein the clothing embedding is used to modify intermediate features generated by the first neural network during the obtaining the further noise.

7. The method of claim 1, further comprising, prior to decoding the denoised image latent, repeating until the denoised image latent converges to a further latent:
providing the denoised image latent, the text embedding, the clothing embedding, the information concerning the pose, and the mask to the first neural network to update the further noise; and
removing the further noise from the denoised image latent.

8. The method of claim 1, wherein the first neural network includes a U-net neural network.

9. The method of claim 1, wherein the noise includes a Gaussian noise.

10. A computing device comprising:
a processor; and
a memory storing instructions that, when executed by the processor, configure the computing device to:
receive an input image, the input image including an image of a body of a person and a first clothing image, the first clothing image including a first clothing worn by the person;
receive a text including a description of the first clothing;
receive a further input image, the further input image including a second clothing;
encode the input image into an image latent associated with a latent space;
generate, based on the further input image, a mask corresponding to the second clothing;
extract, from the input image, using a pretrained neural network, at least one feature of the person present in the input image, the at least one feature including one or more of the following: an ethnicity of the person, a gender of the person, an age of the person, and an orientation of the body of the person with respect to a plane of the input image;
add the at least one feature to the text to obtain an updated text;
extract, from the input image, using a further pretrained neural network, information concerning a pose of the person in the input image;
encode the updated text into a text embedding aligning with the latent space;
encode the further input image into a clothing embedding;
randomly generate a noise for the image latent;
add the noise to the image latent to obtain a noisy image latent;
provide the noisy image latent, the text embedding, the clothing embedding, and the mask to a first neural network to obtain a further noise;
while obtaining the further noise, provide the information concerning the pose as a condition to the first neural network;
remove the further noise from the noisy image latent to obtain a denoised image latent; and
decode, using a second neural network, the denoised image latent into an output image, the output image including a modified image of the body dressed in the second clothing.

11. The computing device of claim 10, wherein the output image depicts the person adopting the pose.

12. The computing device of claim 10, wherein the instructions further configure the computing device to:
encode the input image into an image embedding; and
provide the image embedding as a condition to the first neural network during the obtaining the further noise.

13. The computing device of claim 12, wherein the image embedding is used to correct the denoised image latent to cause the modified image of the body to match the image of the body in the input image.

14. The computing device of claim 10, wherein the instructions further configure the computing device to modify the output image by removing at least one artifact from a face image present in the output image.

15. The computing device of claim 10, wherein the clothing embedding is used to modify intermediate features generated by the first neural network when obtaining the further noise.

16. The computing device of claim 10, wherein the instructions further configure the computing device to, prior to decoding the denoised image latent, repeat, until the denoised image latent converges to a further latent:
provide the denoised image latent, the text embedding, the clothing embedding, the information concerning the pose, and the mask to the first neural network to update the further noise; and
remove the further noise from the denoised image latent.

17. The computing device of claim 10, wherein the first neural network includes a U-net neural network.

18. A non-transitory computer-readable storage medium, the computer-readable storage medium including instructions that, when executed by a computing device, cause the computing device to:
- receive an input image, the input image including an image of a body of a person and a first clothing image, the first clothing image including a first clothing worn by the person;
- receive a text including a description of the first clothing;
- receive a further input image, the further input image including a second clothing;
- encode the input image into an image latent associated with a latent space;
- generate, based on the further input image, a mask corresponding to the second clothing;
- extract, from the input image, using a pretrained neural network, at least one feature of the person present in the input image, the at least one feature including one or more of the following: an ethnicity of the person, a gender of the person, an age of the person, and an orientation of the body of the person with respect to a plane of the input image;
- add the at least one feature to the text to obtain an updated text;
- extract, from the input image, using a further pretrained neural network, information concerning a pose of the person in the input image;
- encode the updated text into a text embedding aligning with the latent space;
- encode the further input image into a clothing embedding;
- randomly generate a noise for the image latent;
- add the noise to the image latent to obtain a noisy image latent;
- provide the noisy image latent, the text embedding, the clothing embedding, and the mask to a first neural network to obtain a further noise;
- while obtaining the further noise, provide the information concerning the pose as a condition to the first neural network;
- remove the further noise from the noisy image latent to obtain a denoised image latent; and
- decode, using a second neural network, the denoised image latent into an output image, the output image including a modified image of the body dressed in the second clothing.

* * * * *